Figure 1:
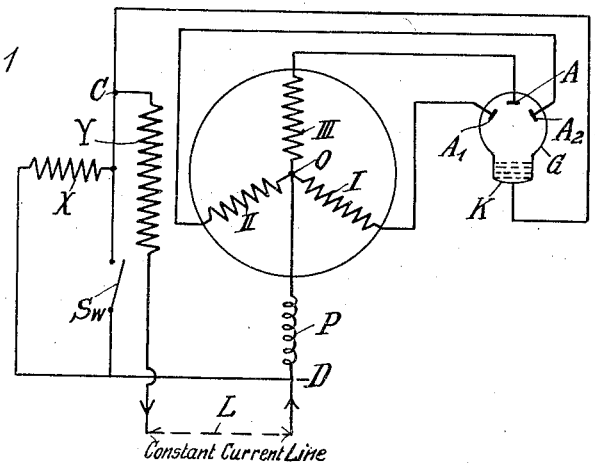

Oct. 1, 1935.    M. DÉRI    2,015,745
ELECTRICAL SYSTEM
Filed Jan. 21, 1933    3 Sheets-Sheet 1

Inventor:
Max Déri
by Karakichan
Atty.

Oct. 1, 1935.       M. DÉRI       2,015,745
ELECTRICAL SYSTEM
Filed Jan. 21, 1933       3 Sheets-Sheet 2

Inventor:
Max Déri
by Karlchichaeé
Atty.

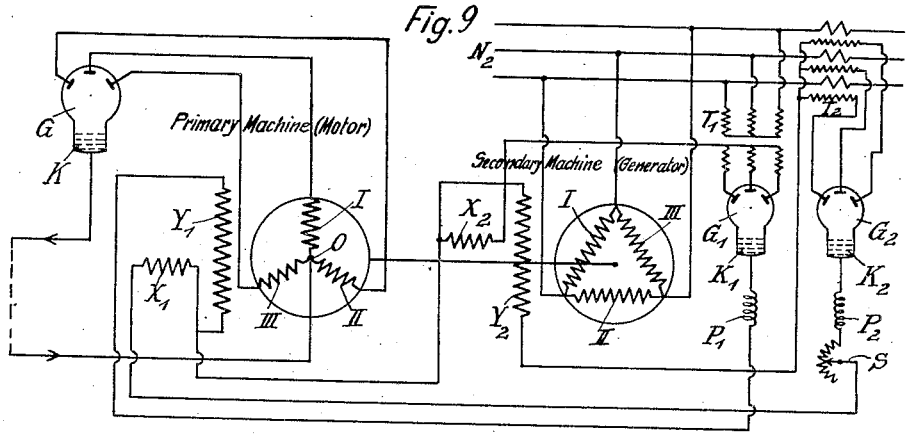
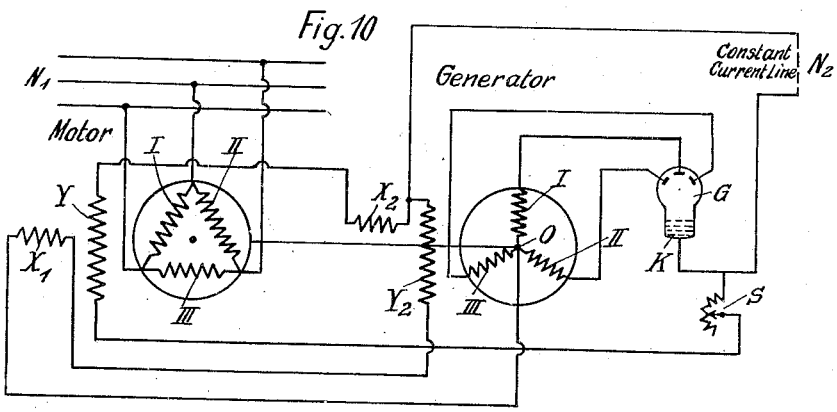
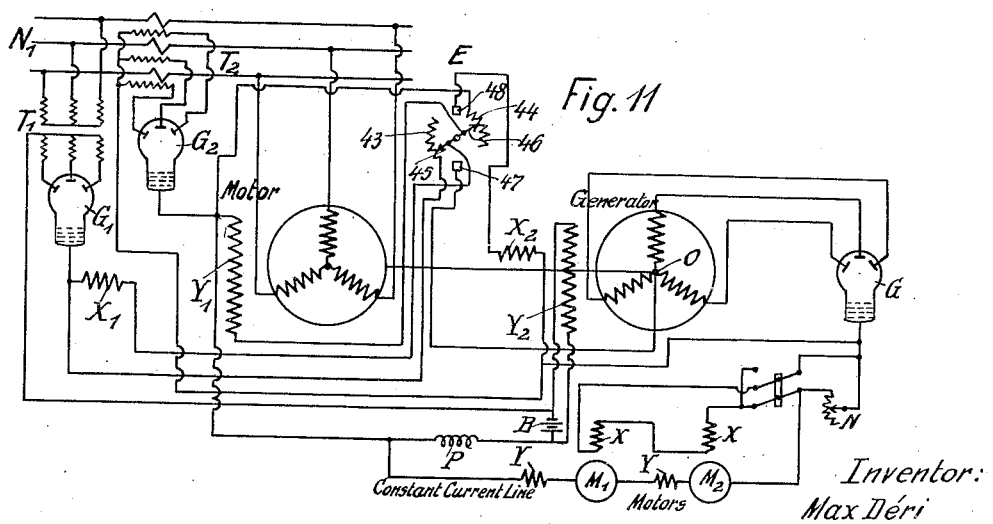

Patented Oct. 1, 1935

2,015,745

UNITED STATES PATENT OFFICE 2,015,745

ELECTRICAL SYSTEM

Max Déri, Meran, Italy

Application January 21, 1933, Serial No. 652,873
In Austria March 29, 1930

17 Claims. (Cl. 171—228)

My invention relates to electrical systems and more particularly to systems comprising a multiphase synchronous machine.

It is an object of my invention to provide an electrical system of this kind in which the synchronous machine is arranged to be operated with direct current of constant intensity.

It is another object of my invention to provide an electrical system in which a multiphase synchronous machine is operated as a generator or as a motor with direct current of constant intensity.

It is a further object of my invention to combine in an electrical system a multiphase synchronous machine, arranged to be operated with direct current of constant intensity, with other electrical machines, for instance generators or motors.

In one embodiment of my invention a multiphase synchronous machine arranged to be operated with direct current of constant intensity is mechanically coupled to another synchronous machine so that the system forms a unit for converting electrical energy of constant current intensity into another form of energy, for instance into three-phase current of constant voltage, and vice versa.

In another embodiment of my invention a multi-phase synchronous machine adapted to be operated with direct current of constant intensity is arranged as a generator in a power transmitting system by electrically connecting the machine with direct current motors.

In a third embodiment of my invention a multi-phase synchronous machine of the type referred to is coupled mechanically to another machine operated as an electromotor and is used as a generator for feeding direct current of constant intensity to direct motors.

In all embodiments of my invention the multiphase synchronous machine is designed in such manner that the direct current fed to or supplied by the machine is automatically held constant at any speed load or output. Thus for instance in the embodiment in which the synchronous machine is used in a motor-generator in combination with another machine the direct current intensity is held constant regardless of the speed depending upon the output to be converted by the motor-generator, this output being adjustable in a simple manner.

In the embodiment in which the synchronous machine is used in a power transmitting system in connection with direct current motors, the intensity of the direct current is held constant regardless of the speed of the motors. A variation of the latter corresponds to a change of the voltage of the motors and a counter-voltage is automatically produced in the synchronous machine in order to maintain the balance in the system.

In the drawings affixed to this specification and forming part thereof, wiring diagrams of some embodiments of my invention are illustrated diagrammatically by way of example.

In the drawings

Figure 2:
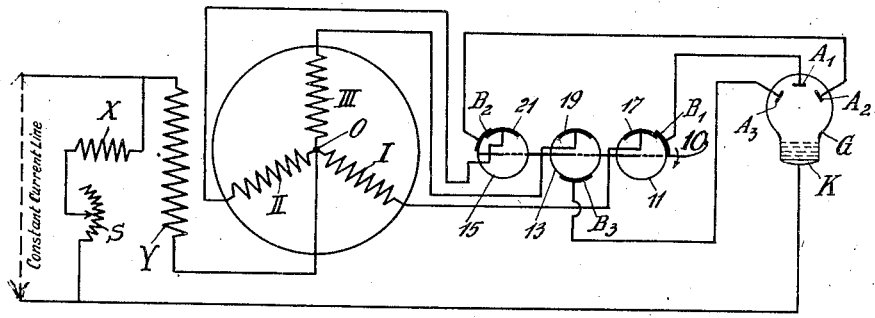
Figure 3:
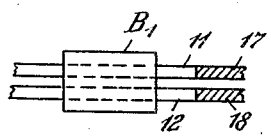
Figure 4:
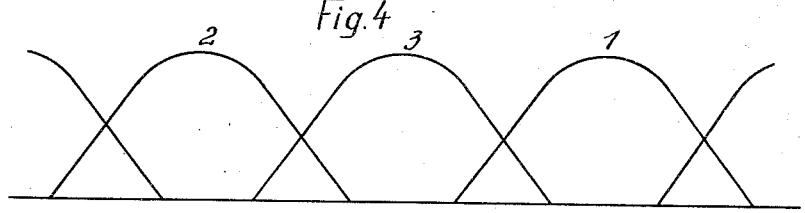
Figure 5:
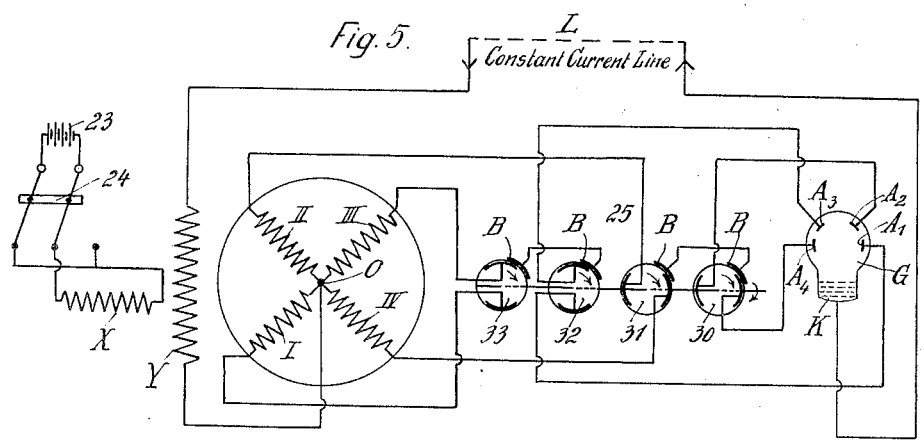
Figure 7:
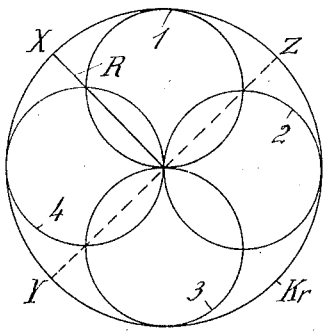
Figure 6:
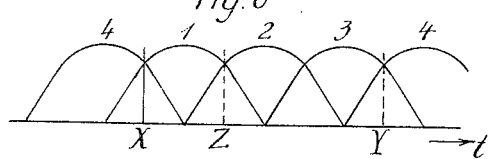
Figure 8:
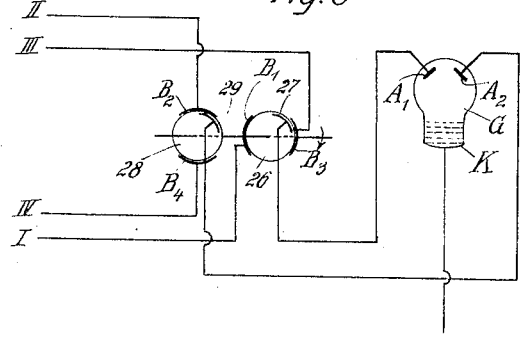

Fig. 1 is a wiring diagram of a system in which a multiphase synchronous machine is used as a generator or a motor operable with direct current of constant intensity, Fig. 2 is a wiring diagram of another embodiment similar to that shown in Fig. 1 combined with a rotary switch device, Fig. 3 shows a modification of the device shown in Fig. 2, Fig. 4 is a diagram serving for the explanation of the operation of the device shown in Fig. 2, Fig. 5 is another embodiment of my invention similar to that shown in Fig. 2, Figs. 6 and 7 are diagrams serving for the explanation of the operation of the embodiment shown in Fig. 5, Fig. 8 is a wiring diagram of a further embodiment of my invention similar to that shown in Figs. 2 and 5, Figs. 9 and 10 are wiring diagrams of motor-generators in which my invention is used for converting three-phase current of constant voltage into direct current of constant intensity, and vice versa.

Fig. 11 is a wiring diagram of still another embodiment consisting of a motor-generator similar to that shown in Fig. 10, in combination with a set of direct current motors.

Referring to the drawings and first to Fig. 1, a multiphase synchronous machine shown as a three-phase machine is provided with a three-phase stator winding consisting of winding sections I, II, III and a star point O. The outer terminals of the stator windings are connected to the anodes $A_1$, $A_2$, $A_3$ of a rectifier G. The rotor of the machine is provided with two exciting windings X—X and Y—Y with their axes arranged so as to include an angle of $$\frac{\pi}{n}$$

wherein $n$ is the number of poles of the machine. In the following description it is assumed that the machine has two poles so that the angle between the axes of the exciting windings is 90°. L is a constant direct current line the branches of which are connected to one terminal of the exciting winding Y and to the star point O, respectively, the other terminal of winding Y being connected to one terminal of the exciting winding X at C, the connecting point being connected to the cathode K of the rectifier G. The other terminal of winding X is connected at D to the branch of line L connected to the star point O, a choke coil P being inserted between the connecting point D and the star point O for levelling the current flowing through winding X. Sw is a switch for short-circuiting the machine except winding Y, when the machine is at rest or about to be started from rest to normal running.

The operation of the device is as follows:—

While the machine is not running, switch Sw is closed so that the constant current line is not interrupted by the machine, the current of the line flowing through the exciting winding Y and the switch Sw. If it is desired to start the machine, its rotor is set rotating by a driving engine (not shown), if the machine operates as a generator, or by means of a starter (not shown) or the like, if the machine operates as a motor. If the machine operates as a generator, its speed is determined by the speed of the driving engine, while in the operation of the machine as a motor the speed is determined by the speed of the apparatus driven by the motor. It should however be understood that the machine shown in Fig. 1 has not a determined speed of its own, but that in each case the speed is determined by the apparatus with which the rotor of the machine is mechanically coupled.

When the speed of the rotor exceeds a predetermined minimum value, the voltages consecutively excited in windings I, II, III, cause consecutive arc discharges in the rectifier G, so that a direct current always flows from the cathode K through switch Sw, choke coil P, star point O, one of the windings I, II, III and one of the anodes $A_1$, $A_2$, $A_3$ back to the cathode K. The currents flowing in the windings I, II, III lag considerably in phase relative to the field of the winding Y, since the circuit is substantially reactive. Thus the currents in the stator windings I, II, III have phases approximately opposed to the phase of the field of winding Y. At a certain speed the direct current flowing in the machine when switch Sw is closed, has the same intensity as the constant current flowing in line L. At this speed switch Sw may be opened and the direct current flowing in line L will now flow through the stator windings, the rectifier G and winding Y. Under this condition of operation the machine still runs idle, the voltage drop between the points C, D being very small and winding X being practically currentless. The machine neither consumes nor feeds energy from or to the line L, respectively, the currents induced by the exciting winding Y in the stator windings I, II, III being wattless.

If the machine runs under load as a generator or as a motor the current flowing from the machine to the line or from the line to the machine must of course be constant and equal to the constant current flowing in line L. The voltage drop however between the terminals of the machine is not constant and varies according to the output or input of the machine. When the machine runs under load, the currents flowing in the stator windings have a watt-component which is induced by the exciting winding X energized by a current proportional to the voltage drop arising between the points C and D. Hence the current which energizes winding X is proportional to the output or input of the machine. Thus the exciting current flowing in winding X is automatically varied in correspondence to the output or input of the machine, so that the intensity of the current delivered to or fed from the machine remains always constant and equal to the intensity of the current flowing in the line L.

Since the winding or field X—X induces the energy components of the currents, it is called hereinafter "inducing" winding or field. The winding or field Y—Y inducing the wattless components of the currents is called, in contradistinction thereto, "compensating" winding or field.

In Fig. 2 of the drawings an embodiment of the invention is shown resembling the one illustrated in Fig. 1, except that a switching device is inserted between the outer terminals of the multiphase winding and the anodes of the rectifier G and an adjusting resistance S is connected in series to the inducing winding X—X by which the speed or the output of the machine can be regulated. The switching device referred to is formed as a rotary switch comprising a plurality of discs 11, 13, 15, mounted on a shaft 10 the number of which corresponds to the number of phases (in the embodiment shown in the drawings: 3). Each disc is provided with a contact segment 17, 19, 21, respectively, arranged in alignment at corresponding portions of the discs 11, 13, 15. $B_1$, $B_2$, $B_3$ are stationary contact brushes arranged opposite to sectors of the disc including angles of 120° with each other, as indicated in Fig. 2. The brushes $B_1$, $B_2$, $B_3$ are connected to the anodes $A_1$, $A_2$, $A_3$ of the rectifier G, respectively. The length of the contact segments is approximately equal to one third of the periphery of the discs.

The operation of this device is substantially the same as of that shown in Fig. 1 except the following points: The shaft 10 is the shaft of the rotor of the synchronous machine or an extension thereof. If desired, the shaft 10 might be formed as an auxiliary shaft driven from the shaft of the machine by means of suitable gearings or the like. In consequence thereof the discs 11, 13 and 15 are rotated in synchronism with the rotor of the machine, the direction of rotation being indicated by the arrow. In the position shown in Fig. 2 the anode $A_1$ is connected with the terminal of winding section I by contact segment 17 and contact brush $B_1$. In a similar manner anode $A_2$ is connected to winding section II by contact segment 21 and contact brush $B_2$. Anode $A_3$, however, is disconnected from winding section III, since brush $B_3$ is out of contact with segment 19. Due to the rotation of the switching device the connection between anode $A_1$ and winding section I is maintained for a time interval corresponding to one third of a period. During the next following third of the period a connection between anode $A_3$ and winding section III is established by the contact segment 19 and contact brush $B_3$, while a connection between anode $A_2$ and winding section II will be established by contact segment 21 and contact brush $B_2$ during the last third of each period. By suitably adjusting the contact brushes $B_1$, $B_2$, $B_3$ the connection between the anodes $A_1$, $A_2$, $A_3$, and the associated winding sections I, II, III will be established at the time intervals in which the outer terminals of the winding sections have the proper potential for establishing an arc between the associated anode and the cathode K of the rectifier.

Fig. 3 shows a part of a modified embodiment of the switching device shown in Fig. 2 which comprises a pair of discs in each phase, for instance in the first phase two discs 11 and 12, each provided with a contact segment 17 and 18, respectively. The brushes $B_1$, $B_2$, $B_3$ are not connected to the anodes, their only function in this embodiment being to establish an electrical connection between associated contact segments, for instance 17 and 18 at the proper time intervals. The operation of this device corresponds to that of the device shown in Fig. 2.

Fig. 4 is a diagram of the currents flowing in the winding sections I, II, III. The abscissæ indicate the time $t$ and the ordinates are the current intensities. The currents flowing in the single phases are indicated by 1, 2, 3.

In Fig. 5 an embodiment is shown in which the synchronous machine is a four-phase machine. The machine comprises four winding sections I, II, III, IV connected in star-fashion, the star point being indicated by O. Exciting winding Y is connected in series between line L and star point O, exciting winding X is connected to a direct current supply, for instance a battery 23, if desired by means of a pole changer 24. The rectifier G is provided with four anodes $A_1$, $A_2$, $A_3$ and $A_4$ which are connected to the outer terminals of the corresponding winding sections I, II, III, IV, respectively, by means of a rotor switch 25 comprising four discs 30, 31, 32 and 33 arranged in alignment with their contact segments on a shaft rotating in synchronism with the rotor of the machine. Each disc is provided with a pair of contact segments extending over approximately ¼ of the periphery of the disc. The contact segments of the discs 32 and 33 are arranged in alignment with the portions of the periphery of the other discs not covered by contact segments. Contact brushes B are arranged in alignment so that each brush covers approximately one fourth of the periphery of the discs. The contact segments are connected to the outer terminals of the winding sections I, II, III, IV and to the anodes $A_1$, $A_2$, $A_3$, $A_4$, in the manner shown in the drawings. When the discs are rotated in the direction of the arrows, the brushes B being stationary or vice versa, the brushes are rotated while the discs are stationary, the winding sections are subsequently connected with the associated anodes during one fourth of a period, so that in the winding sections currents flow which are indicated in Fig. 6 by the curves 1, 2, 3 and 4. In this figure the abscissæ are the time $t$ and the ordinates the currents as in Fig. 4. Fig. 7 is another diagram from which the temporary values of the currents can be seen. In this diagram four circles 1, 2, 3, 4 are arranged within a circle $Kr$ having the double diameter in such manner that the centre of the circle $Kr$ coincides with the periphery of each of the small circles and the latter touch the large circle from the interior at points spaced from each other by one fourth of the periphery of the large circle. R is a rotating radius vector going through a full rotation in each period and indicating the temporary values of the currents in the winding sections I, II, III, IV at any time by its intersections with the circles 1, 2, 3, 4. The radius vector R is shown in Fig. 7 in three positions X, Y, Z corresponding to the points X, Y, Z in Fig. 6.

Fig. 8 shows a simplified embodiment similar to that shown in Fig. 5 which is useful in connection with a machine operated at a low voltage. The outer terminals of the winding sections I, II, III, IV are connected with contact brushes $B_1$, $B_2$, $B_3$ and $B_4$, respectively, arranged in pairs opposite to each other on the periphery of two discs 26 and 28, each provided with a contact segment 27 and 29, respectively. The discs 26 and 28 are arranged in alignment on a shaft rotating in synchronism with the rotor of the synchronous machine. Each contact segment and each contact brush covers approximately one fourth of the periphery of a disc and the brushes $B_1$, $B_3$ are arranged in staggered relation to the brushes $B_2$ and $B_4$, while the contact segments 27 and 29 are arranged in alignment. The contact segments 27 and 29 are connected to the anodes $A_1$ and $A_2$ of a rectifier G. The operation of the device is analogous to that shown in Fig. 5.

It should be understood that in the switching devices heretofore described short-circuiting of any winding section is avoided and that the connections between the winding sections and the anodes are interrupted at times when the current has dropped to zero, so that no arcs occur at the contact segments and the contact brushes.

While in the preceding figures a synchronous machine according to my invention has been shown as such, in the following figures this machine is shown in combination with other machines in order to illustrate some preferred applications of my invention.

According to Fig. 9, a synchronous machine embodying my invention is used as a motor and is mechanically coupled with a generator supplying three-phase current of constant voltage into a three-phase line. The primary machine corresponds exactly to that described in connection with Fig. 1 except that the cathode K of the rectifier G is directly connected to the outgoing branch of the direct current line $N_1$ carrying current of constant intensity. The exciting windings $X_1$, $Y_1$ arranged on the rotor of the machine are connected with the corresponding windings of the other machine in a manner to be described hereinafter. The sections I, II, III of the multiphase winding of the stator of the machine are connected in star fashion, the star point being indicated by O while the outer terminals of the winding sections are connected with the anodes of the rectifier G. The star point O is connected to the incoming branch of the direct current line $N_1$.

The secondary machine is a generator which is mechanically coupled with the primary machine and resembles the latter in that it is provided with a rotor carrying a pair of exciting windings $X_2$ and $Y_2$. The multiphase winding sections of the stator are connected in Δ and supply three-phase current of constant voltage into a three-phase line $N_2$. The inducing winding $X_1$ of the motor and the compensating winding $Y_2$ of the generator are connected in series to each other. In a similar manner the exciting windings $Y_1$ and $X_2$ are connected in series. Besides this in each machine the exciting windings are connected with each other at one terminal. If the rotors of the machines are arranged on the same shaft, the latter may be made hollow in order to arrange the connections between the exciting windings within the hollow shaft.

The exciting windings $Y_1$ and $X_2$ connected in series with each other are fed with current of constant intensity which may be supplied by a suitable source, for instance a battery or an exciting machine of constant voltage. In the embodiment shown in Fig. 9 the constant exciting current is fed from the line $N_2$ by means of a voltage transformer $T_1$ and a rectifier $G_1$ the primaries and secondaries of transformer $T_1$ being connected in star and to the phases of line $N_2$ and the anodes of rectifier $G_1$, respectively. The cathode $K_1$ of the rectifier $G_1$ is connected to the winding $Y_1$, a choke $P_1$ being inserted, if desired, in the connection of cathode $K_1$ and winding $Y_1$. If desired, the exciting current of the windings $Y_1$ and $X_2$ may be supplied by the direct current line $N_1$, but I prefer the embodiment shown in the figure because the line $N_1$ has a high potential which I prefer not to introduce into the rotors.

The exciting windings $X_1$ and $Y_2$ connected in series with each other are excited by a direct current proportional to the phase currents fed by the generator to the line $N_2$. This is accomplished by providing a current transformer $T_2$ and a rectifier $G_2$ the primaries of the current transformer $T_2$ being serially connected into the phases of line $N_2$, respectively, and the secondaries of transformer $T_2$ being connected in star and to the anodes of rectifier $G_2$, respectively, the cathode $K_2$ of which is connected to the winding $X_1$, through a choke $P_2$ and an adjustable resistance $S$ for controlling at will the output of the converter. By suitably choosing the connections between the winding sections I, II, III and the phases of the line $N_2$ a torque opposed to that of the motor may be given to the generator.

The operation of the device shown in Fig. 9 is as follows: The motor as such operates in the same manner as that shown in Fig. 1, except that its exciting windings $X_1$, $Y_1$ are energized by currents drawn from line $N_2$ by means of the transformers $T_1$ and $T_2$. The motor drives the generator with a speed determined by the synchronous speed of the generator. Due to the interconnections of the exciting windings with each other and with the line $N_2$ by means of the voltage transformer and the current transformer, the motor is operated with constant current and the generator with constant voltage independently from the load or the output fed into the line $N_2$. The machines automatically follow any variation of the load or the output, since the exciting current flowing in the windings $X_1$ and $Y_2$ is proportional to the phase currents flowing in the generator. The converter therefore converts direct current of constant intensity into three-phase current of constant voltage.

In Fig. 10 an embodiment of my invention is shown by which three-phase current of constant voltage is converted into direct current of constant intensity. This is accomplished by interchanging the primary and secondary machines so that the machine connected to the three-phase line $N_1$ operates as a motor and the machine connected to the direct current line as a generator. The exciting windings of the machines are connected in series to each other in a similar manner as shown in Fig. 9, inducing winding $X_1$ being connected in series to compensating winding $Y_2$ and inducing winding $X_2$ being connected in series to compensating winding $Y_1$. Windings $X_1$ and $Y_2$ are excited with direct current of constant intensity which is accomplished in this embodiment by connecting them in series between the incoming branch of line $N_2$ and the star point O of the multiphase winding sections of the generator. The exciting windings $Y_1$ and $X_2$ are supplied with variable current which is accomplished in this figure by connecting them in series between the incoming branch of the line $N_2$ and the cathode K of the rectifier G so that these windings are connected in shunt to the phase windings of the generator and the exciting windings $X_1$ and $Y_2$. In order to control the output of the system an adjustable resistance S is connected in series to the windings $Y_1$ and $X_2$.

In Fig. 11 a synchronous machine according to this invention is used as part of a power transmission suitable in the first line for plants with frequently changing load such as winding machines, crane installations, rolling mills, locomotive or ship drives or the like. In this figure I have shown two machines mechanically coupled with each other, the first comprising exciting windings $X_1$, $Y_1$ and acting as a motor, the second comprising the exciting windings $X_2$ and $Y_2$ and acting as a generator in a similar manner as shown in Fig. 10, except that the exciting currents are supplied from the three-phase line $N_1$ by means of voltage and current transformers $T_1$ and $T_2$, similar to the arrangement shown in Fig. 9. While the generator in this figure is the secondary machine with respect to the motor, it simultaneously acts as a primary machine of a power transmission comprising the generator and a set of direct current motors $M_1$ and $M_2$. It should be understood that if desired the generator may be driven in some other manner than shown in the figure, which, however, is a preferred embodiment in view of the automatic control of the motor driving the generator.

The primary machine of the converter, i. e. the motor comprising the exciting windings $X_1$, $Y_1$ is connected with its three-phase winding to the three-phase line $N_1$. Inducing winding $X_1$ is excited with constant current fed from the line $N_1$ through voltage transformer $T_1$ and rectifier $G_1$. Compensating winding $Y_1$ is excited with a current proportional to the output, this current being fed by line $N_1$ through current transformer $T_2$ and rectifier $G_2$. Winding $X_1$ is connected by means of a starting device, described hereinafter, to the star point O of the secondary machine of the electrical converter, and to the generator windings. Winding $Y_1$ of the primary machine is connected by means of the starting device in series with exciting winding $X_2$ of the secondary machine. Exciting winding $Y_2$ of this machine is connected in series to the exciting winding $X_1$ of the motor, the series connection including rectifier $G_1$, winding $X_1$, starting device E, star point O, multiphase winding of the generator, rectifier G, rotors and exciting windings Y of the motors $M_1$, $M_2$, choke P, winding $Y_2$, voltage transformer $T_1$. Besides this the exciting winding $Y_2$ is connected to a constant current supply, for instance a battery B supplying a constant current to winding $Y_2$, so that the generator is self-exciting. The battery B intermittently supplying current to winding $Y_2$ is automatically charged during the running of the system. Through the series circuit comprising exciting windings $Y_1$ and $X_2$ a current flows which is proportional to the phase current of the motor or to the output of the converter, this current being fed by line $N_1$ through current transformer $T_2$ and rectifier $G_2$. This circuit is also connected to the voltage of the serially connected direct current motors $M_1$ and $M_2$, as hereinafter described. These motors are controlled by means of an adjustable resistance N connected in shunt to the exciting windings X of the motors $M_1$ and $M_2$. If desired, independent controlling means may be provided for these motors.

The operation of this device is as follows: Electrical energy supplied by the line $N_1$ is converted into direct current of constant intensity by the two synchronous machines forming the electrical converter. The direct current is fed to the motors $M_1$ and $M_2$. Since the latter are operated with constant current any variation of the load or output causes a variation of the voltage at the terminals of the serially connected motors. This voltage affects the current flowing in the exciting windings $Y_1$ and $X_2$, so that the output of the converter is automatically changed in proportion to the output of the motors $M_1$, $M_2$. This effect is aided by the fact that in the exciting windings $Y_1$ and $X_2$ a direct current flows the intensity of which is proportional to the phase currents of the primary motor this current being supplied from the current transformer $T_2$. Thus double means are provided for securing the balance of energy between the electrical converter and the motors $M_1$, $M_2$. In some cases, however, it is sufficient to provide only one of these balancing means.

In the embodiment shown in Fig. 11a, constant speed of the primary motor and the generator is determined by the synchronous speed of the motor. If, however, the generator is driven by other means, for instance by an internal combustion engine, the speed is controlled by controlling the speed of the driving machine. In this case the transformers $T_1$ and $T_2$ and the series connection of the windings $X_2$, $Y_2$ with windings $X_1$, $Y_1$ are to be omitted and instead winding $Y_2$ may be excited by battery B and winding $X_2$ is connected in parallel to the voltage arising at the terminals of the generator so that it is excited with a current proportional to the output.

In Fig. 11 a starting device is inserted between the motor and the generator of the converter. The starting device E comprises two starting resistances 43 and 44 cooperating with slidable contacts 45 and 46, respectively, in such manner that a larger or smaller portion of the starting resistances is connected in shunt to the windings $X_1$, $Y_1$, the terminals of which are connected with one terminal of the starting resistances and to the sliding contacts, respectively. 47 and 48 are stationary contact pieces arranged opposite the ends of resistances 43 and 44 and connected with star point O and winding $X_2$, respectively. During normal running of the converter sliding contacts 45 and 46 are positioned so as to be in contact with contact pieces 47 and 48, respectively, so that the connection heretofore described between the exciting windings of the machine is completed. For starting purposes the sliding contacts are positioned so as to disconnect windings $X_1$ and $Y_1$ from the generator and to short-circuit them over starting resistances 43 and 44 so that the motor may be started as a slip ring motor with a field winding short-circuited in four phases. In consequence thereof the motor can be started with small load. When synchronous speed is reached, sliding contacts 45 and 46 are shifted so as to cut out the starting resistances and to establish the connection of the exciting windings $X_1$, $Y_1$ with the exciting windings $X_2$, $Y_2$ which is done after sliding contacts 45 and 46 have been brought into the position referred to above in which they are in contact with contact pieces 47, 48, respectively.

It should be understood that the converter described in connection with Figs. 9–11 may be operated in reverse direction so that the motor operates as a generator and the generator as a motor. In consequence thereof in the embodiment shown in Fig. 11 the motors $M_1$, $M_2$ if operated as generators, which will occur in some cases, for instance in railway motors, can feed energy back into the line $N_1$.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An electrical system comprising in combination a direct current line, a multiphase synchronous machine having a multiphase winding connected in star and two exciting windings arranged with their axes so as to include an angle of $$\frac{\pi}{n}$$

($n$=number of poles), a multiphase rectifier connecting said stator winding with said direct current line, means for supplying direct current of constant intensity to one of said exciting windings and means for supplying to the other exciting winding a direct current having an intensity proportional to the direct current voltage in said direct current line.

2. An electrical system comprising in combination a direct current line, a multiphase synchronous machine having a multiphase winding connected in star and two exciting windings arranged with their axes so as to include an angle of $$\frac{\pi}{n}$$

($n$=number of poles), a multiphase rectifier connecting said stator winding with said direct current line, means for supplying direct current of constant intensity to one of said exciting windings and means for supplying to the other exciting winding a direct current having an intensity proportional to the load current of said machine.

3. An electrical system comprising a direct current line, a multiphase synchronous machine having a multiphase winding connected in star fashion and two exciting windings arranged with their axes so as to include an angle of $$\frac{\pi}{n}$$

($n$=number of poles) with each other, a multiphase rectifier connecting said stator winding with said direct current line, means for supplying direct current of constant intensity to one of said exciting windings and means for automatically supplying to the other exciting winding a direct current having an intensity proportional to the load current of said machine.

4. An electrical system comprising a direct current line, a multiphase synchronous machine having a multiphase winding connected in star fashion and two exciting windings arranged with their axes so as to include an angle of $$\frac{\pi}{n}$$

($n$=number of poles) with each other, a multiphase rectifier connecting said stator winding with said direct current line, means for supplying direct current of constant intensity to one of said exciting windings and means for automatically supplying to the other exciting winding a direct current having an intensity adapted to maintain constant current intensity in said line.

5. An electrical system comprising a direct current line, a multiphase synchronous machine having a multiphase winding connected in star fashion and two exciting windings arranged with their axes so as to include an angle of $$\frac{\pi}{n}$$

($n$=number of poles) with each other and being connected in series and in shunt with said direct current line, respectively, and a multiphase rectifier connecting said stator winding with said direct current line.

6. An electrical system comprising a direct current line, a multiphase synchronous machine, a multiphase winding forming part of said machine and having outer terminals and a star point connected with said direct current line, a multiphase rectifier having a cathode connected with said direct current line and anodes, a rotary multipole switch periodically connecting said terminals with said anodes, respectively, two exciting windings forming part of said machine and arranged with their axes so as to include an angle of $$\frac{\pi}{n}$$

($n$=number of poles) with each other, means for supplying direct current of constant intensity to one of said exciting windings and means for supplying to the other exciting winding a direct current having an intensity proportional to the load current of said machine.

7. An electrical system comprising a direct current line, a multiphase synchronous machine, a multiphase winding forming part of said machine and having outer terminals and a star point connected with said direct current line, a multiphase rectifier having a cathode connected with said direct current line and anodes, a rotary multipole switch periodically connecting said terminals with said anodes, respectively, two exciting windings forming part of said machine and arranged with their axes so as to include an angle of $$\frac{\pi}{n}$$

($n$=number of poles) with each other, means for supplying direct current of constant intensity to one of said exciting windings and means for supplying to the other exciting winding a direct current having an intensity proportional to the load current of said machine, said rotary switch being so designed as to connect each terminal with the associated anode during the time interval in which the field induced by the associated winding section is opposed to the field induced by the exciting winding supplied with direct current of constant intensity.

8. An electrical system comprising a direct current line, a multiphase synchronous machine, a multiphase winding forming part of said machine and having outer terminals and a star point connected with said direct current line, a multiphase rectifier having a cathode connected with said direct current line and anodes, a rotary multipole switch periodically connecting said terminals with said anodes, respectively, said switch being so designed as to prevent short-circuiting of any section of said winding and to interrupt the connection between each pair of said terminals and said anodes when the current flowing through them has dropped to zero, two exciting windings forming part of said machine and arranged with their axes so as to include an angle of $$\frac{\pi}{n}$$

($n$=number of poles) with each other, means for supplying direct current of constant intensity to one of said exciting windings and means for supplying to the other exciting winding a direct current having an intensity proportional to the load current of said machine.

9. An electrical system comprising a direct current line, a multiphase synchronous machine, a multiphase winding forming part of said machine and having outer terminals and a star point connected with said direct current line, a multiphase rectifier having a cathode connected with said direct current line and anodes, a rotary multipole switch periodically connecting said terminals with said anodes, respectively, two exciting windings forming part of said machine and arranged with their axes so as to include an angle of $$\frac{\pi}{n}$$

($n$=number of poles) with each other, means for supplying direct current of constant intensity to one of said exciting windings and means for supplying to the other exciting winding a direct current having an intensity proportional to the load current of said machine, the intensities of the currents supplied to said exciting windings being chosen so as to compensate the voltage drop occurring at normal current between said star point and said cathode by the voltage induced by said exciting winding supplied with constant direct current and to produce the torque by the cooperation of the currents flowing in said multiphase winding and the current flowing in the other exciting winding.

10. An electrical system comprising a multiphase synchronous machine, a multiphase winding forming part of said machine and having a star point and outer terminals, a multiphase rectifier having anodes connected to said terminals, respectively, and a cathode, a single direct current line of constant current intensity, said star point and said cathode being connected into said direct current line in series connection, two exciting windings forming part of said machine and arranged with their axes so as to include an angle of $$\frac{\pi}{n}$$

($n$=number of poles) with each other, means for supplying direct current of constant intensity to one of said exciting windings, means for supplying to the other exciting winding a direct current having an intensity proportional to the direct current voltage in said line, and a second electric machine having an exciting winding connected in series with the exciting winding of said synchronous machine to which direct current of constant intensity is supplied.

11. A motor-generator for transforming electrical energies of constant voltage and of constant current into each other comprising two mechanically coupled multiphase synchronous machines, a multiphase winding forming part of one of said machines and having a star point and outer terminals, a multiphase rectifier having anodes connected to said terminals, respectively, and a cathode, a single direct current line of constant current intensity, said star point and said cathode being connected into said direct current line in series connection, two exciting windings in each machine forming part thereof and arranged with their axes so as to include an angle of $$\frac{\pi}{n}$$

($n$=number of poles) with each other, means for supplying direct current of constant intensity to one exciting winding in each machine, means for supplying to the other exciting winding in each machine a direct current having an intensity proportional to the direct current voltage in said line, and means for connecting the exciting windings fed with constant current and the exciting windings fed with variable intensity in series with each other, respectively.

12. A motor-generator for transforming electrical energies of constant voltage and of constant current into each other comprising a multiphase synchronous machine, a multiphase winding forming part of said machine and having a star point and outer terminals, a multiphase rectifier having anodes connected to said terminals, respectively, and a cathode, a single direct current line of constant current intensity, said star point and said cathode being connected into said direct current line in series connection, two exciting windings forming part of said machine and arranged with their axes so as to include an angle of $$\frac{\pi}{n}$$

($n$=number of poles) with each other, means for supplying direct current of constant intensity to one of said exciting windings, means for supplying to the other exciting winding a direct current having an intensity proportional to the direct current voltage in said line, and a second electric machine having an exciting winding connected in series with the exciting winding of said synchronous machine to which direct current of constant intensity is supplied, said second machine being designed so as to be operated with electric energy of constant voltage.

13. An electrical system comprising a multiphase synchronous machine, a multiphase winding forming part of said machine, and having a star point and outer terminals, a multiphase rectifier having anodes connected to said terminals, respectively, and a cathode, a single direct current line of constant current intensity, said star point and said cathode being connected into said direct current line in series connection, two exciting windings forming part of said machine and arranged with their axes so as to include an angle of $$\frac{\pi}{n}$$

($n$=number of poles) with each other, means for supplying direct current of constant intensity to one of said exciting windings, means for supplying to the other exciting winding a direct current having an intensity proportional to the direct current voltage in said line, and a direct current motor connected in series into said direct current line, said motor having a rotor winding and a compensating winding both connected in series with the exciting winding of said synchronous machine which is fed with direct current of constant intensity.

14. An electrical system comprising a multiphase synchronous machine, a multiphase winding forming part of said machine, and having a star point and outer terminals, a multiphase rectifier having anodes connected to said terminals, respectively, and a cathode, a single direct current line of constant current intensity, said star point and said cathode being connected into said direct current line in series connection, two exciting windings forming part of said machine and arranged with their axes so as to include an angle of $$\frac{\pi}{n}$$

($n$=number of poles) with each other, means for supplying direct current of constant intensity to one of said exciting windings, means for supplying to the other exciting winding a direct current having an intensity proportional to the direct current voltage in said line, a direct current motor connected in series into said direct current line, said motor having a rotor winding and a compensating winding both connected in series with the exciting winding of said synchronous machine which is fed with direct current of constant intensity, an exciting field winding forming part of said motor and means for supplying a variable direct current to said exciting field winding.

15. A motor-generator for transforming electrical energies of constant voltage and of constant current into each other comprising two mechanically coupled multiphase synchronous machines, a multiphase winding forming part of one of said machines and having a star point and outer terminals, a multiphase rectifier having anodes connected to said terminals, respectively, and a cathode, a single direct current line of constant current intensity, said star point and said cathode being connected into said direct current line in series connection, two exciting windings in each machine forming part thereof and arranged with their axes so as to include an angle of $$\frac{\pi}{n}$$

($n$=number of poles) with each other, means for supplying direct current of constant intensity to one exciting winding in each machine, means for supplying to the other exciting winding in each machine a direct current having an intensity proportional to the direct current voltage in said line, means for connecting the exciting windings fed with constant current and the exciting windings fed with variable intensity in series with each other, respectively, and a direct current motor connected in series into said direct current line, said motor having a rotor winding and a compensating winding both connected in series with the exciting windings of said synchronous machines which are fed with direct current of constant intensity.

16. A motor-generator for transforming electrical energies of constant voltage and of constant current into each other comprising two mechanically coupled multiphase synchronous machines, a multiphase winding forming part of one of said machines and having a star point and outer terminals, a multiphase rectifier having anodes connected to said terminals, respectively, and a cathode, a single direct current line of constant current intensity, said star point and said cathode being connected into said direct current line in series connection, two exciting windings in each machine forming part thereof and arranged with their axes so as to include an angle of $$\frac{\pi}{n}$$

($n$=number of poles) with each other, means for supplying direct current of constant intensity to one exciting winding in each machine, means for supplying to the other exciting winding in each machine a direct current having an intensity proportional to the direct current voltage in said line, adjustable starting resistances, means for temporarily disconnecting the exciting windings of one of said machines and for short-circuiting them over said starting resistances, and means for connecting during normal operation the exciting windings fed with constant current and the exciting windings fed with variable intensity in series with each other, respectively.

17. An electrical system comprising a multiphase synchronous machine, a multiphase winding forming part of said machine, and having a star point and outer terminals, a multiphase rectifier having anodes connected to said terminals, respectively, and a cathode, a single direct current line of constant current intensity, said star point and said cathode being connected into said direct current line in series connection, two exciting windings forming part of said machine and arranged with their axes so as to include an angle of $$\frac{\pi}{n}$$

($n$=number of poles) with each other, means for supplying direct current of constant intensity to one of said exciting windings, means for supplying to the other exciting winding a direct current having an intensity proportional to the direct current voltage in said line, a direct current motor connected in series into said direct current line, said motor having a rotor winding and a compensating winding both connected in series with the exciting winding of said synchronous machine which is fed with direct current of constant intensity, and means for automatically producing a counter-voltage in said synchronous machine for compensating the voltage of said motor.

MAX DÉRI.